(No Model.)

V. A. & M. A. LEHUCHER & A. MATHIEU.
COVER FOR BOXES.

No. 482,258. Patented Sept. 6, 1892.

Witnesses:
J. A. Rutherford
Robt. Pruett

Inventors:
Victor A. Lehucher
Melina A. Lehucher
Adrien Mathieu
By James L. Norris
Attorney

THE NORRIS PETERS CO., PHOTO-LITHO., WASHINGTON, D. C.

UNITED STATES PATENT OFFICE.

VICTOR ALFRED LEHUCHER, MELINA AUGUSTINE LEHUCHER, AND ADRIEN MATHIEU, OF PARIS, FRANCE.

COVER FOR BOXES.

SPECIFICATION forming part of Letters Patent No. 482,258, dated September 6, 1892.

Application filed June 28, 1892. Serial No. 438,326. (No model.) Patented in France February 20, 1892, No. 219,560.

*To all whom it may concern:*

Be it known that we, VICTOR ALFRED LEHUCHER and MELINA AUGUSTINE LEHUCHER, (divorced wife of François Lecourt,) manufacturers of preserved articles of food, and ADRIEN MATHIEU, chief clerk for Messrs. Lehucher & Co., of Paris, France, citizens of the Republic of France, residing at Paris, France, have invented a certain new and useful Improvement in Covers for Boxes for Preserves, (for which we have obtained a patent in France, No. 219,560, dated February 20, 1892;) and we do hereby declare that the following is a full, clear, and exact description of the same.

The invention has reference to an improved cover for hermetically closing boxes for containing preserves, whereby consumers are enabled to inspect the contents of such boxes without being compelled to remove the cover.

Figure 5:
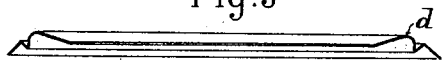
Figure 4:
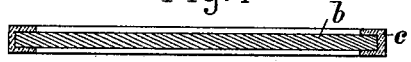
Figure 3:
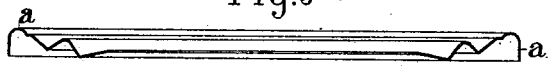
Figure 1:
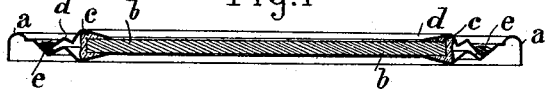
Figure 2:
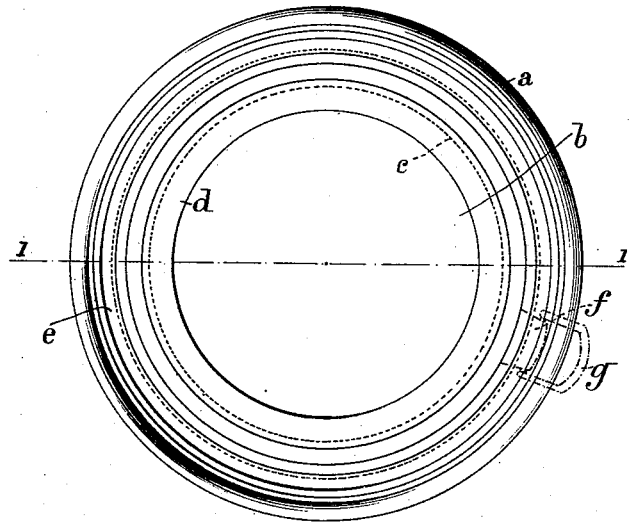

In the annexed drawings, Figure 1 is a sectional elevation of our improved cover, taken on the line $l\ l$, Fig. 2. Fig. 2 is a plan thereof. Fig. 3 is a sectional elevation showing the cover-ring detached. Fig. 4 is a similar view showing the glass disk provided with its rubber packing-ring, and Fig. 5 is a detached sectional view of the ring for uniting the glass disk to the cover.

Our improved cover consists, essentially, of a cover-ring $a$, soldered or otherwise hermetically fixed to the body of a box (not shown) and so stamped as to form a bed or recess, as shown in the drawings, in which is arranged a disk $b$ of ordinary glass or other transparent material, provided at its edge with a packing-ring $c$, of rubber or other suitable material, in which it is embedded. The connection of the glass disk $b$ with the cover $a$ is effected by means of a ring $d$, of tinned sheet-iron, having the shape shown. The said ring $d$ serves to receive the disk $b$ and its packing-ring $c$ and is fixed to the cover-ring $a$ by means of solder $e$. With this arrangement a perfectly-tight joint is formed around the glass disk $b$ and a perfectly-hermetic closure of the box is effected, while the contents of the box can be inspected through the glass $b$. The ring $d$ may be provided on its periphery, as shown in dotted lines in Fig. 2, with a projection or tongue $f$, in which a ring, key, or other instrument $g$ may be inserted, by means of which the ring $d$ can be readily torn off when it is desired to open the box.

We do not limit ourselves to the form of cover shown in the drawings, as our invention can also be applied equally well to covers having a circular, oval, polygonal, or other shape. It is also evident that the glass plate may be of any desired shape.

We claim—

1. A cover for preserve-boxes, consisting of a flanged sheet-metal ring $a$, adapted to be secured to a box, a sheet-metal ring $d$, having its outer annular edge attached to the upper surface of the flanged ring between the inner and outer edges thereof, and a transparent disk $b$, confined air-tight at its periphery between the inner edges of the two rings, substantially as described.

2. A cover for preserve-boxes, consisting of a flanged sheet-metal ring $a$, adapted to be secured to a box, a sheet-metal ring $d$, having its outer annular edge soldered to the upper surface of the flanged ring between the inner and outer edges thereof, and a transparent disk $b$, having its periphery provided with an annular packing-ring $c$ and confined air-tight between the inner edges of the two rings, substantially as described.

In witness whereof we have hereunto set our hands and seals this 16th day of June, 1892.

VICTOR ALFRED LEHUCHER. [L. S.]
MELINA AUGUSTINE LEHUCHER. [L. S.]
ADRIEN MATHIEU. [L. S.]

Witnesses:
ROBT. M. HOOPER,
D. H. BRANDON, Jr.